March 15, 1938.    C. GIRL ET AL    2,111,284

SPEED CONTROL DEVICE

Filed March 23, 1936    3 Sheets-Sheet 1

INVENTORS
CHRISTIAN GIRL
STUART H. CALDWELL
WAYNE E. DUNSTON
BY
ATTORNEYS

March 15, 1938.                C. GIRL ET AL                2,111,284
                            SPEED CONTROL DEVICE
                           Filed March 23, 1936            3 Sheets-Sheet 2
FIG.5.ᴬ
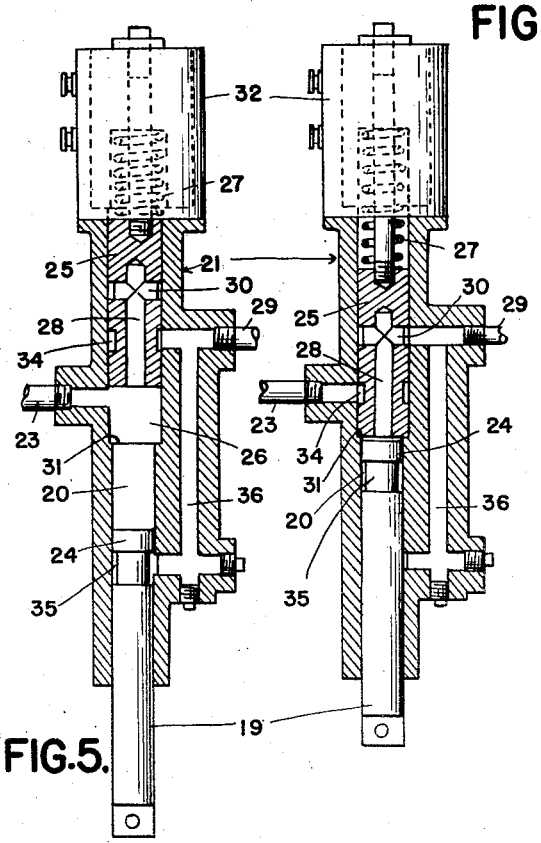
FIG.5.
FIG.8.
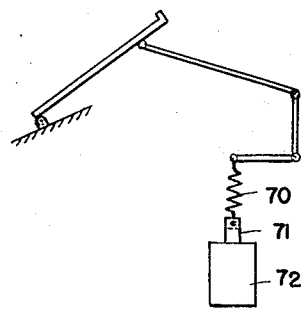
FIG.9.
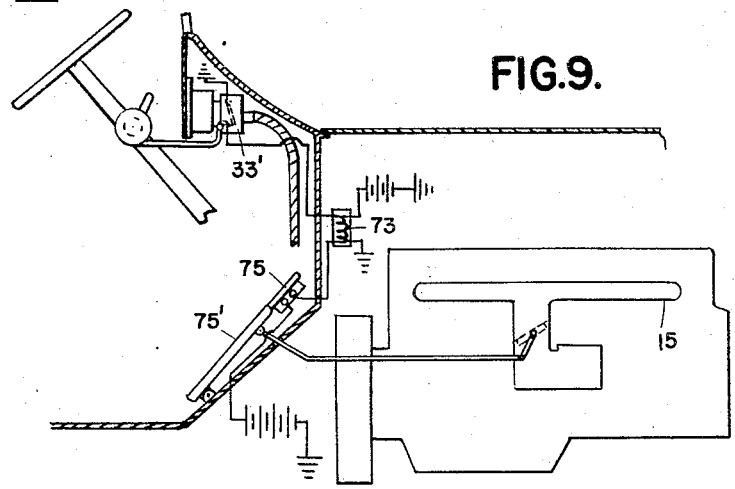
INVENTORS
CHRISTIAN GIRL
STUART H. CALDWELL
WAYNE E. DUNSTON
BY
                    ATTORNEYS March 15, 1938.　　　　C. GIRL ET AL　　　　2,111,284

SPEED CONTROL DEVICE

Filed March 23, 1936　　　　3 Sheets-Sheet 3

INVENTOR
CHRISTIAN GIRL
STUART H. CALDWELL
WAYNE E. DUNSTON
BY
ATTORNEYS

Patented Mar. 15, 1938

2,111,284

UNITED STATES PATENT OFFICE 2,111,284

SPEED CONTROL DEVICE

Christian Girl and Stuart H. Caldwell, Detroit, and Wayne E. Dunston, Pleasant Ridge, Mich.; said Stuart H. Caldwell and Wayne E. Dunston assignors to said Christian Girl Application March 23, 1936, Serial No. 70,422

13 Claims. (Cl. 177—311.5)

This invention relates generally to motor vehicles and refers more particularly to an improved safety device for motor vehicles.

It has been proposed to increase the safety factor of motor vehicles by providing various different types of devices designed to automatically restrict the maximum speed of the vehicle within fixed limitations. Unfortunately, these limitations do not meet all driving or emergency conditions and in many cases, actually increase, rather than decrease the liability of accidents. In other words, no provision is made in devices of the above character for taking care of an emergency demanding a quick acceleration of the vehicle above the maximum setting and since emergencies of this character often arise, it follows that devices of the above type are objectionable rather than beneficial to safe driving of the vehicle. In addition, fixed maximum speed governing devices of the type employed in the past are not capable of adjustment by the operator as he is driving the vehicle and accordingly, it is possible that the set maximum speed of the device is entirely too high for safe operation in districts where the traffic is congested.

One of the principal objects of the present invention is to overcome the foregoing objections by providing a signal device enabling the operator to fully open the throttle but having provision for physically indicating to the operator that he is exceeding the maximum safe or allowable speed previously selected. Thus, it will be seen that the device materially increases the safety factor of the vehicle not only because it does not positively prevent the quick acceleration required to meet certain emergency conditions, but also because it indicates the desired maximum speed to the operator without the necessity of the operator interrupting his view of the traffic conditions in advance of the vehicle to observe the speedometer usually mounted on the instrument board of the body.

Another advantageous feature of the present invention resides in a signalling device of the character set forth in the preceding paragraph having means accessible for manipulation by the operator to vary the maximum speed at which the signal operates in accordance with the safe or allowable speed in the region within which the vehicle is being propelled.

In addition to the foregoing, the present invention contemplates a relatively simple, inexpensive signalling device capable of being readily installed on vehicles of standard design without material alterations in any of the parts of the vehicle. This latter feature, as well as the foregoing features, and other objects, will be made more apparent as this description proceeds, especially when considered in connection with the accompanying drawings, wherein:

Figure 5 is a longitudinal sectional view through the signal device shown in Figure 1;

Figure 5A is a fragmentary sectional view of the construction shown in Figure 5 with the parts in a different position;

Figure 8 is a semi-diagrammatic view of a slightly modified form of signal device;

Figure 9 is a diagrammatic view of a modified form of the invention;

In the embodiment of the invention featured in Figures 1 to 8 inclusive, oil pressure from the engine lubricating system is employed in conjunction with the accelerator, or throttle operating pedal to resist operation of the accelerator after the vehicle has approached a predetermined maximum speed. In other words, the construction is such that when the speed of the vehicle reaches a pre-selected maximum speed, a definite resistance is set up to further operation of the accelerator in a direction to open the throttle of the engine and this resistance indicates to the operator that he has approached the allowable or safe maximum speed desired. However, the resistance is not sufficient to prevent the operation of the accelerator required to fully open the throttle of the engine which is oftentimes necessary to avoid accidents.

Figure 4:
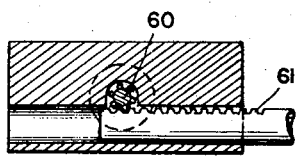
Figure 4 is a cross sectional view taken substantially on the plane indicated by the line 4—4 of Figure 2.
Figure 1:
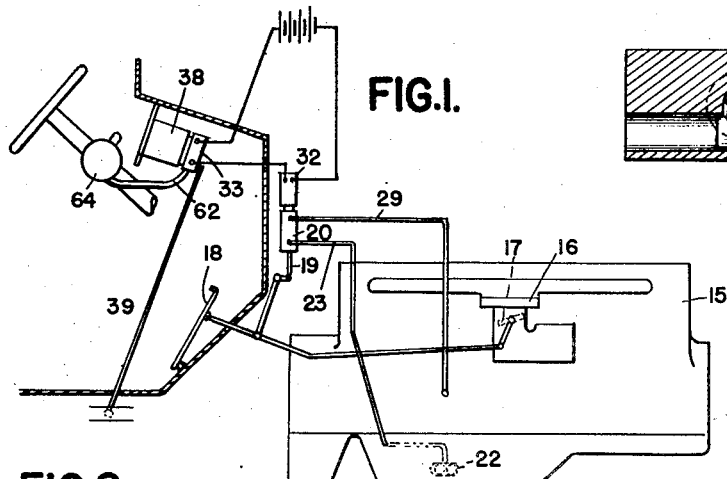
Figure 1 is a semi-diagrammatic view of a portion of the motor vehicle equipped with a control system constructed in accordance with this invention.

Referring to Figure 1 of the drawings, it will be noted that the reference character 15 indicates an internal combustion engine having a conventional fuel induction system 16 comprising a throttle 17 and an accelerator pedal 18 operatively connected to the throttle for actuating the latter. In addition, the accelerator pedal 18 is connected to the lower end of a piston 19 supported for reciprocation within a cylinder 20 forming a part of the signalling device 21 and communicating with the discharge side of the lubricant pump 22 located within the crank case of the engine 15 to supply lubricant under pressure in accordance with conventional practice. Upon reference to Figure 5, it will be noted that the fluid pressure supply line 23 extending from the discharge side of the pump to the cylinder 20 communicates with the interior of the latter intermediate the ends of the same at a point beyond the head 24 of the piston 19.

The flow of lubricant under pressure from the pump 22 through the supply line 23 to the cylinder 20 is controlled by a valve plunger 25 reciprocably mounted in the enlarged portion 26 of the upper end of the cylinder and normally urged to the position therein shown in Figure 5A by means of a spring 27 acting on the upper end of the valve plunger. In this position of the valve plunger 25, the discharge end of the supply line 23 is closed and the longitudinal passage 28 in the plunger 25 establishes communication between the interior of the cylinder 20 and the return conduit 29, through the medium of a radial passage 30 formed in the plunger 25 intermediate the ends thereof in communication with the upper end of the longitudinal passage 28. It will, of course, be understood that the conduit 29 communicates with the interior of the crank case so as to return the lubricant to its source of supply.

It necessarily follows from the foregoing that when the valve plunger 25 is in its lowermost position shown in Figure 5A, the lubricant pressure in the cylinder 20 is relieved permitting unrestricted movement of the piston 19 by the accelerator 18. In this connection, attention may be called to the fact that the enlarged portion 26 of the cylinder forms an annular seat 31 in the cylinder for engaging the lower end of the valve plunger 25 and that this seat is spaced above the head 24 of the piston 19 a sufficient distance to permit unrestricted operation of the accelerator throughout its range without contacting with the valve plunger.

In the present instance, provision is made for raising the valve plunger 25 to the position thereof shown in Figure 5 when the rate of travel of the vehicle exceeds a predetermined speed and this is accomplished by means of a solenoid 32 adapted to be energized in dependence upon the operation of the governor 33. When the valve plunger 25 has been moved by the solenoid 32 to its uppermost position, the discharge end of the supply line 23 is opened permitting lubricant under pressure to flow into the cylinder 20 above the head 24 of the piston 19. The pressure thus built up in the cylinder reacts against the piston 19 to resist further upward movement thereof by the accelerator 18 and this, of course, indicates to the operator that he has approached the desired predetermined maximum speed. It may be pointed out at this time that any lubricant under pressure leaking past the valve plunger 25 is accumulated in the annular groove 34 in the periphery of the valve plunger and is directed to the return conduit 29 communicating with this annular groove. Also, any lubricant escaping past the head 24 of the piston is accumulated in the annular groove 35 formed in the piston below the head and is discharged into the return conduit 29 by means of a longitudinally extending passage 36.

Figure 2:
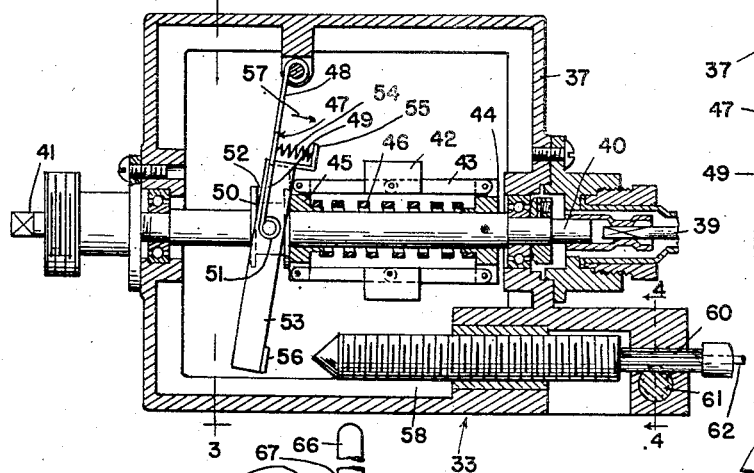
Figure 2 is a longitudinal sectional view through the governor device for actuating the signal shown in Figure 1.

It has previously been stated that the solenoid 32 is energized in dependence upon the operation of the governor 33 and reference will now be made to the specific construction of this governor. As shown in Figure 2, the governor comprises a casing 37 supported in a position between the speedometer 38 of the vehicle and the driving cable 39 for the speedometer. The driving cable 39 is driven in accordance with conventional practice by the running gear of the vehicle and the free end of this cable is operatively connected to one end of the drive shaft 40 of the governor. The drive shaft is journalled in the casing 37 and the opposite end 41 thereof is connected to the speedometer for actuating the latter.

Upon reference to Figure 2, it will be noted that the centrifugal weights 42 of the governor are carried by pivotally interconnected links 43 at the inner ends of the latter and that the outer ends of the links are pivoted to collars 44 and 45 mounted on the drive shaft 40 in axial spaced relationship. The collar 44 is fixed to the drive shaft 40 while the collar 45 is slidably supported on the latter and is normally held in spaced relationship to the collar 44 by means of a spring 46 surrounding the drive shaft 40 between the collars. The arrangement is such that when the speed of the engine 15 propelling the vehicle exceeds an amount determined largely by the spring 46, the weights 42 are moved outwardly causing the collar 45 to move in a direction toward the collar 44 against the action of the spring 46.

Figure 3:
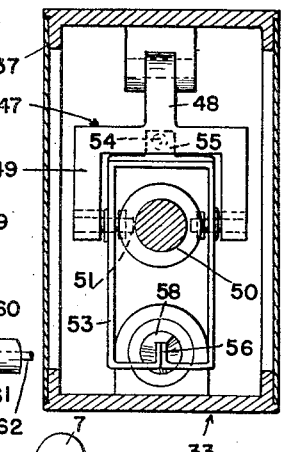
Figure 3 is a cross sectional view taken substantially on the plane indicated by the line 3—3 of Figure 2.
Figure 7:
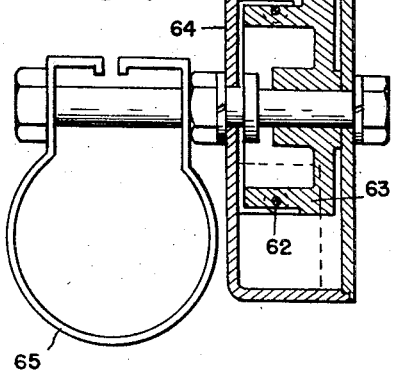
Figure 7 is a sectional view taken substantially on the plane indicated by the line 7—7 of Figure 6.
Figure 6:
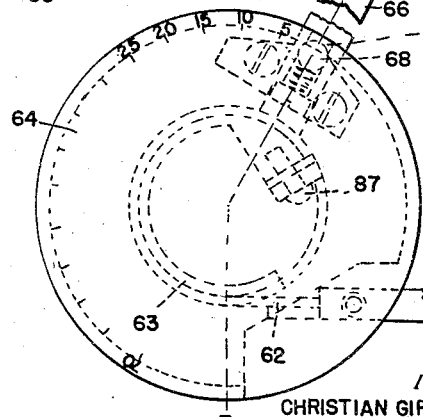
Figure 6 is a side elevational view of the maximum speed control having certain parts broken away for the sake of clearness.

In the present instance, movement of the collar 45 toward the collar 44 closes a circuit to the solenoid 32 and this is accomplished by means of a collapsible two-part arm 47 having a section 48 pivoted to the upper wall of the casing 37 for swinging movement about an axis extending transversely to the axis of the drive shaft 40 and having a portion 49 at the lower end bifurcated to receive between the furcations thereof, the hub 50 on the slidable collar 45. As shown in Figure 3, suitable pins 51 are secured to the lower ends of the furcations and extend into an annular recess 52 formed in the hub 50 in such a manner that the section 48 of the collapsible arm 47 is swung about its pivotal connection with the casing by the collar 45 as it is moved axially of the drive shaft in response to the centrifugal weights 42. The cooperating section 53 of the arm 47 is substantially rectangular in shape as viewed in Figure 3 and the opposite sides of the same are connected to the section 48 by the pins 51, in such a manner as to permit the section 53 to rock relative to the section 48 about the axis of the pins 51. With reference to Figure 2, it will be noted that the two sections of the arm 47 are normally maintained in assembled relation for swinging movement as a unit about the pivotal connection of the section 48 with the casing by means of a spring 54 having one end secured to a projection 55 extending upwardly from the top side of the section 53 and having the opposite end connected to the section 47.

Mounted upon the bottom side of the section 53 of the arm 47 is a contact element 56 operable in dependence upon swinging movement of the arm in the direction of the arrow 57 in Figure 2 to engage an adjustable element 58 in dependence upon outward displacement of the centrifugal weights 42. The contact 58 is threadedly mounted in the casing 37 for axial movement toward and away from the contact 56 so as to control the interval of engagement of the contacts in dependence upon outward movement of the centrifugal weights 42. In other words, the contact 58 is adjustable to vary the speed at which the circuit to the solenoid 32 is closed to effect operation of the valve plunger 25, in the manner hereinbefore described. It will be understood from the foregoing that if the operator ignores the resistance offered by the signal 21 to continued opening of the throttle, the centrifugal weights 42 will move outwardly to a greater extent and, in so doing, cause the arm 47 to break against the action of the spring 54. The result of this action would be that the section 48 would continue to swing about its pivotal connection with the casing and the lower end of the section 53 would remain in engagement with the electrical contact 58.

In the present instance, the contact 58 is rotated by means of a pinion 60 adapted to mesh with a rack 61 and fixed to the contact 58 for rotation therewith as a unit. The rack 61 is operated by a Bowden wire 62 having one end connected to the rack 61 and having the opposite end reeved partially around a drum 63 and secured to the latter in the manner shown in Figure 6 by means of a lock screw 87. The drum 63 is supported in a casing 64 having a bracket 65 secured thereto of suitable construction to permit the same to be clamped to the steering column of the vehicle. Upon reference to Figure 7, it will be noted that the drum 63 is provided with a lever 66 projecting out of the casing through an annular slot 67 formed in the side wall of the casing. The control lever 66 operates through the Bowden wire 62 to vary the position of the contact 58 relative to the contact 56 and, in turn, to control the maximum speed at which the resistance is opposed to the operation of the accelerator by the signal device 21. In this connection, it is to be noted that predetermined increments of adjustment are provided for by means of a spring pressed detent 68 carried by the lever 66 within the drum and engageable with suitable notches 69 formed by aperturing the side wall of the casing 64 at circumferentially spaced points. The notches are preferably predeterminedly spaced so that each notch corresponds substantially to a particular speed of the vehicle, with the result that the operator may accurately pre-select the maximum speed desired by manipulating the control lever 66.

In Figure 8 of the drawings, I have shown a signal device differing in construction from the one described previously in connection with the above form of the invention in that the resistance to movement of the accelerator pedal after a predetermined maximum speed has been reached, is afforded by a spring 70 having one end operatively connected to the accelerator and having the other end connected to the armature 71 of the solenoid 72. The solenoid is operated in the same manner as set forth in the preceding modification and in the present instance, functions to produce tension in the spring 70. In other words, the construction in Figure 8 is such that when the maximum pre-selected speed is reached, a force is exerted by the spring 70 tending to counteract the pressure applied to the accelerator by the operator so as to indicate definitely that he has approached the desired speed.

Figure 10:
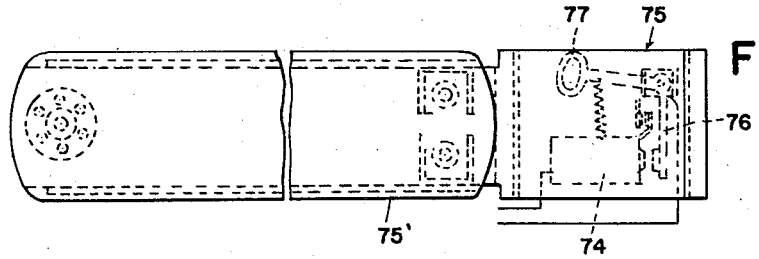
Figure 10 is a plan view of the signal device employed in the embodiment of the invention shown in Figure 9.
Figure 10:
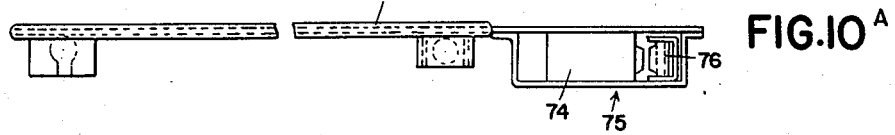

The embodiment of the invention shown in Figures 9 and 10 operates on a slightly different principle to indicate to the driver that he has approached the pre-selected maximum speed. In this modification, the governor, diagrammatically indicated by the reference character 33', operates a relay 73 which, in turn, closes the circuit to a vibrator 74 located within the housing 75 forming an extension of the free end of the accelerator pedal 75' or in any other convenient position to vibrate against the operator's foot. It will be apparent from Figure 10 that the vibrator is of conventional construction with the exception that the arm 76 of the vibrator operates a clapper 77 located within the housing 75 to intermittently contact with the side walls of the housing 75 with a force sufficient to produce a vibration in the accelerator pedal capable of being sensed by the operator's foot engaging the pedal.

Figure 11:
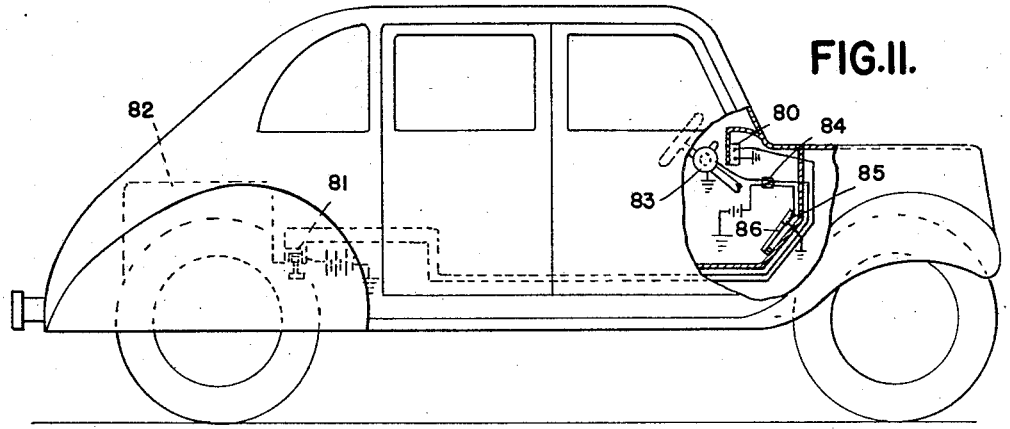
Figure 11 is a diagrammatic side elevational view of a signal device constructed in accordance with this invention and applied to a rear engine vehicle.
Figure 12:
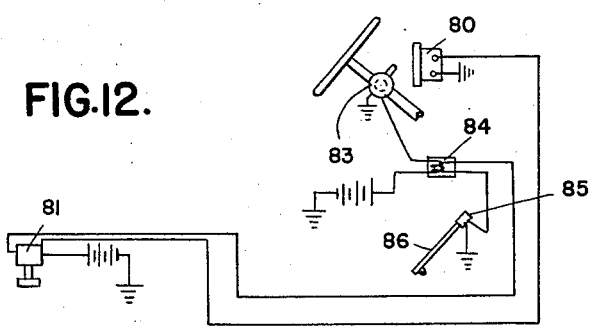
Figure 12 is a diagram of the signalling circuit featured in connection with the signal illustrated in Figure 11.

The modified form of the invention shown in Figures 11 and 12 finds particular utility for installation in rear engine vehicles. As shown diagrammatically in both of the above figures, the speedometer 80 of the vehicle is actuated by an electrical sending device 81 in the form of a generator driven by the drive shaft of the engine 82. The principle of operating the speedometer by an electrical sending device positioned at a point remote from the speedometer is well known and broadly consists in recording the speed of the vehicle in dependence upon variations in the potential of the generator effected by the changes in speed of the engine 82. In the present instance, the conventional circuit from the sending device to the speedometer is altered by introducing a rheostat 83 and a relay 84 in the circuit. As shown in Figure 11, the rheostat is secured to the steering post of the vehicle for convenient manipulation by the operator to vary the speed of the vehicle at which the relay operates to close a circuit to a mechanical vibrator 85 associated with the accelerator pedal 86 in the same manner as defined in connection with the modified form of the invention featured in Figures 9 and 10.

While several different embodiments have been selected for the purpose of illustrating the present invention, nevertheless, it will be noted that each of the modifications are directed to a signal device having provision for physically indicating to the operator, the moment the vehicle reaches a pre-selected maximum speed. Also, in each embodiment, the signal may be ignored by the driver and the vehicle operated at its maximum possible speed without the necessity of manipulating any additional controls or effecting the function of the signal. In addition, each of the constructions shown herein are provided with means permitting the operator to pre-select the desired speed by relatively simple adjustment capable of being mounted in a position for convenient manipulation.

What we claim as our invention is:

1. In a motor vehicle, an internal combustion engine having a source of fuel supply, a throttle for controlling the supply of fuel to the engine to regulate the speed of the latter, a pump for supplying lubricant under pressure to various parts of the engine, a control for the throttle, and means actuated by the fluid pressure supplied by the pump to resist continued opening of the throttle by the control when the vehicle is exceeding a predetermined speed.

2. In a motor vehicle, an internal combustion engine having a source of fuel supply, a throttle for controlling the supply of fuel to the engine for regulating the speed of the engine, a control for actuating the throttle, a pump for supplying lubricant under pressure to several of the working parts of the engine, and means actuated by the fluid pressure supplied by the pump and effective when the vehicle approaches a predetermined speed to resist continued opening of the throttle with a force sufficient to be noticeable by the operator and insufficient to prevent continued operation of the control in a direction to fully open the throttle.

3. In a motor vehicle, an internal combustion engine having a source of fuel supply, a throttle for controlling the supply of fuel to the engine to regulate the speed of the engine, a control for actuating the throttle, a source of fluid under pressure, a cylinder communicating with said source of fluid under pressure, a plunger acting in said cylinder and connected to the throttle control, a valve device controlling communication between the source of fluid under pressure and cylinder, and means for actuating the valve device when the vehicle is exceeding a predetermined speed to admit fluid under pressure to said cylinder at the side of the plunger required to resist movement of the latter by movement of the control in a direction to open said throttle.

4. In a motor vehicle, an internal combustion engine having a source of fuel supply, a throttle for controlling the supply of fuel to said engine, a control for actuating the throttle, a cylinder, a plunger acting in the cylinder and operatively connected to said control, a source of fluid under pressure, means for introducing fluid under pressure from said source into the cylinder against the plunger to resist movement of the latter by the control in a direction to open the throttle, a governor driven by the engine, and means operated by said governor for actuating the means aforesaid.

5. In a traveling unit, a control member movable in one direction to increase the rate of travel of said unit, and in the opposite direction to decrease the rate of travel of said unit, biasing means exerting a substantially constant active force throughout movement of said member tending to move said member in the direction to decrease the rate of travel of said unit, and means automatically operable at a predetermined rate of travel of said unit to increase the active force by a second force tending to move said member in the direction to decrease the rate of travel.

6. In a traveling unit, a control member movable in one direction to increase the rate of travel of said unit, and in the opposite direction to decrease the rate of travel of said unit, biasing means exerting a substantially constant active force throughout movement of said member tending to move said member in the direction to decrease the rate of travel of said unit, and means automatically operable at a predetermined rate of travel of said unit to increase the active force by a second force tending to move said member in the direction to decrease the rate of travel, the combined effect of said substantially constant active force and said second force, being insufficient to prevent operation of said member in a direction to increase the rate of travel of said vehicle.

7. In a traveling unit, a control member movable in one direction to increase the rate of travel of said unit, and in the opposite direction to decrease the rate of travel of said unit, biasing means exerting a substantially constant active force throughout movement of said member tending to move said member in the direction to decrease the rate of travel of said unit, and means automatically operable at a predetermined rate of travel of said unit to increase the active force by a second substantially constant force tending to move said member in the direction to decrease the rate of travel.

8. In a motor vehicle, an internal combustion engine having a source of fuel supply, a throttle for controlling the supply of fuel to the engine to regulate the speed thereof, said engine also having a source of fluid pressure, a movable control member for said throttle, fluid pressure actuated means cooperating with said throttle, and speed responsive means adapted to connect said fluid pressure means and said source of fluid pressure at a predetermined rate of travel of said vehicle to apply a force tending to move said control member in a direction to decrease the speed of said vehicle.

9. In a motor vehicle, an internal combustion engine having a source of fuel supply, a throttle for controlling the supply of fuel to the engine to regulate the speed thereof, said engine also having a source of fluid pressure, a movable control member for said throttle, fluid pressure actuated means cooperating with said throttle, and speed responsive means adapted to connect said fluid pressure means and said source of fluid pressure at a predetermined rate of travel of said vehicle, to apply a substantially constant force tending to move said control member in a direction to decrease the speed of said vehicle.

10. In a motor vehicle, an internal combustion engine having a source of fuel supply, a throttle for controlling the supply of fuel to the engine to regulate the speed thereof, said engine also having a source of fluid pressure, a movable control member for said throttle, fluid pressure actuated means cooperating with said throttle, and speed responsive means adapted to connect said fluid pressure means and said source of fluid pressure at a predetermined rate of travel of said vehicle, to apply a force tending to move said control member in a direction to decrease the speed of said vehicle, the force applied being instantly noticeable but insufficient at all speeds to prevent movement of said control member in speed increasing direction.

11. In a traveling unit, a control member movable in one direction to increase the rate of travel of said unit, and in the opposite direction to decrease the rate of travel of said unit, and means automatically operable at a predetermined rate of travel of said unit to apply a substantially constant force to said movable control member tending to move said member in speed decreasing direction.

12. In a traveling unit, a control member movable in one direction to increase the rate of travel of said unit, and in the opposite direction to decrease the rate of travel of said unit, and means automatically operable at a predetermined rate of travel of said unit to apply a substantially constant force to said movable control member tending to move said member in speed decreasing direction, said force being sufficient to be instantly noticeable, but insufficient to prevent movement of said member in speed increasing direction.

13. In a traveling unit, a control member movable in one direction to increase the rate of travel of said unit, and movable in the opposite direction to decrease the rate of travel of said unit, and means automatically operable at a predetermined rate of travel of said unit to apply a force to said control member tending to move said member in speed decreasing direction, said force being sufficient to be instantly noticeable, but insufficient to prevent movement of said member in speed increasing direction.

CHRISTIAN GIRL.
STUART H. CALDWELL.
WAYNE E. DUNSTON.